United States Patent
Sugihira et al.

(10) Patent No.: US 10,718,276 B2
(45) Date of Patent: Jul. 21, 2020

(54) FAILURE DIAGNOSIS APPARATUS FOR VARIABLE COMPRESSION RATIO MECHANISM

(71) Applicant: TOYOTA JIDOSHA KABUSHIKI KAISHA, Aichi-ken (JP)

(72) Inventors: Shigehiro Sugihira, Susono (JP); Naoto Kato, Gotenba (JP); Ryutaro Moriguchi, Gotenba (JP); Yushi Shibaike, Susono (JP)

(73) Assignee: TOYOTA JIDOSHA KABUSHIKI KAISHI, Aichi-Ken (JP)

( * ) Notice: Subject to any disclaimer, the term of this patent is extended or adjusted under 35 U.S.C. 154(b) by 445 days.

(21) Appl. No.: 15/650,821

(22) Filed: Jul. 14, 2017

(65) Prior Publication Data

US 2018/0016995 A1 Jan. 18, 2018

(30) Foreign Application Priority Data

Jul. 15, 2016 (JP) ................. 2016-140695

(51) Int. Cl.
| | |
|---|---|
| *F02D 15/02* | (2006.01) |
| *F02D 41/22* | (2006.01) |
| *F02P 5/152* | (2006.01) |
| *F02B 75/04* | (2006.01) |

(Continued)

(52) U.S. Cl.
CPC ............ *F02D 15/02* (2013.01); *F02B 37/183* (2013.01); *F02B 75/04* (2013.01); *F02B 75/045* (2013.01);

(Continued)

(58) Field of Classification Search
CPC .......... F02D 15/02; F02D 15/04; F02D 41/22; F02D 35/027; F02D 13/0219;

(Continued)

(56) References Cited

U.S. PATENT DOCUMENTS

| | | | |
|---|---|---|---|
| 4,834,031 A | 5/1989 | Katoh et al. | |
| 5,740,780 A | 4/1998 | Shimizu et al. | |

(Continued)

FOREIGN PATENT DOCUMENTS

| | | |
|---|---|---|
| JP | 1-105741 U | 7/1989 |
| JP | 7-072515 B2 | 8/1995 |

(Continued)

*Primary Examiner* — David Hamaoui
(74) *Attorney, Agent, or Firm* — Hauptman Ham, LLP

(57) ABSTRACT

A failure diagnosis apparatus according to the present disclosure is applied to a variable compression ratio mechanism that can switch the compression ratio of an internal combustion engine between at least a first compression ratio and a second compression ratio lower than the first compression ratio. When the variable compression ratio mechanism is controlled so as to set the compression ratio of the internal combustion engine to the second compression ratio, the failure diagnosis apparatus advances the ignition timing of one cylinder to a knock inducing ignition timing more advanced than the MBT that does not lead to the occurrence of knock if the actual compression ratio of that cylinder is the second compression ratio but leads to the occurrence of knock if the actual compression ratio of that cylinder is the first compression ratio and diagnoses failure of the variable compression ratio mechanism on the basis of whether knock occurs or not.

4 Claims, 8 Drawing Sheets

(51) Int. Cl.
*F02D 35/02* (2006.01)
*F02B 37/18* (2006.01)
*F02D 13/02* (2006.01)
*F02D 41/02* (2006.01)
*F02D 41/30* (2006.01)
*F01L 1/344* (2006.01)
*F02D 41/00* (2006.01)

(52) U.S. Cl.
CPC ....... *F02D 13/0219* (2013.01); *F02D 35/027* (2013.01); *F02D 41/0205* (2013.01); *F02D 41/22* (2013.01); *F02D 41/3017* (2013.01); *F01L 2001/34426* (2013.01); *F02D 2041/001* (2013.01); *F02D 2200/0402* (2013.01); *F02D 2700/03* (2013.01); *F02P 5/152* (2013.01); *Y02T 10/144* (2013.01); *Y02T 10/18* (2013.01)

(58) Field of Classification Search
CPC ............. F02D 41/0205; F02D 41/3017; F02D 2700/03; F02D 2041/001; F02D 2200/0402; F02B 75/045; F02B 37/183; F02B 75/04; F02P 5/152; Y02T 10/18; Y02T 10/144; F01L 2001/34426
See application file for complete search history.

(56) References Cited

U.S. PATENT DOCUMENTS

| | | | | |
|---|---|---|---|---|
| 6,453,854 | B1* | 9/2002 | Baeuerle | F02B 77/08 123/78 E |
| 6,612,288 | B2* | 9/2003 | Cullen | F02D 15/02 123/406.23 |
| 6,860,244 | B2* | 3/2005 | Glugla | F02D 15/02 123/78 A |
| 10,378,459 | B2* | 8/2019 | Glugla | F02B 75/04 |
| 10,450,983 | B2* | 10/2019 | Glugla | F02D 41/1448 |
| 2016/0177997 | A1 | 6/2016 | Ezaki et al. | |
| 2016/0348595 | A1* | 12/2016 | Kiyomura | F02D 15/02 |

FOREIGN PATENT DOCUMENTS

| | | | |
|---|---|---|---|
| JP | H9-209814 A | | 8/1997 |
| JP | 2010038066 A | * | 2/2010 |
| JP | 2011-174476 A | | 9/2011 |
| JP | 2014-202172 A | | 10/2014 |
| JP | 2015-021433 A | | 2/2015 |
| JP | 2016-118181 A | | 6/2016 |

* cited by examiner

FAILURE DIAGNOSIS APPARATUS FOR VARIABLE COMPRESSION RATIO MECHANISM

RELATED APPLICATIONS

The present application claims priority to Japanese Application Number 2016-140695, filed Jul. 15, 2016, the disclosure of which is hereby incorporated by reference herein in its entirety.

BACKGROUND

Technical Field

The present disclosure relates to a technology of failure diagnosis of a variable compression ratio mechanism used to change the mechanical compression ratio of an internal combustion engine.

Description of the Related Art

A known variable compression ratio mechanism of an internal combustion engine changes the compression ratio by changing the effective length of the connecting rod (see, for example, Patent Literature 4). Patent Literature 1 discloses a technology pertaining to such a variable compression ratio mechanism of an internal combustion engine. In the technology disclosed in Patent Literature 1, when failure of a sensor for measuring the compression ratio is detected, the compression ratio is kept constant at the lowest compression ratio, and the ignition timing is retarded from a predetermined target ignition timing (see Patent Literature 1).

In the technology disclosed in Patent Literature 2, if the compression ratio measured by compression ratio measuring means falls out of a predetermined compression ratio range, the ignition timing is advanced to cause knocking, thereby restoring the variable compression ratio mechanism.

Patent Literature 3 discloses a technology pertaining to an internal combustion engine that performs knock control by which the ignition timing is set to a knock limit ignition timing more retarded than the MBT (Minimum Advance for Best Torque) when knock occurs and to the MBT when knock does not occur. In this technology, failure of the variable compression ratio mechanism is detected on the basis of the ignition timing controlled by the knock control.

PATENT LITERATURE

Patent Literature 1: Japanese Examined Patent Publication No. H07-072515
Patent Literature 2: Japanese Patent Application Laid-Open No. 2015-021433
Patent Literature 3: Japanese Utility Model Application Laid-Open No. H01-105741
Patent Literature 4: Japanese Patent Application Laid-Open No. 2016-118181

SUMMARY

In the case where a compression ratio changing mechanism is provided for each cylinder, as is the case with variable compression ratio mechanisms that change the mechanical compression ratio of the internal combustion engine by changing the effective length of the connecting rod, failure of the compression ratio changing mechanism may occur in an individual cylinder. To detect such failure, a sensor for measuring the compression ratio may be provided for each of the cylinders to detect failure of the compression ratio changing mechanism. However, this requires compression ratio measuring sensors provided for the respective cylinders, leading to an increase in the manufacturing cost necessitated by the increased number of components. Moreover, this arrangement suffers from another problem that it is not possible to distinguish failure of the compression ratio measuring sensor and failure of the compression ratio changing mechanism from each other.

The present disclosure has been made in view of the above-described circumstances, and an object of the present disclosure is to detect failure of a compression ratio changing mechanism in a variable compression ratio mechanism including a compression ratio changing mechanism provided for each of the cylinders.

To solve the above problem, in a failure diagnosis apparatus according to the present disclosure applied to a variable compression ratio mechanism that can switch the compression ratio of an internal combustion engine between at least a first compression ratio and a second compression ratio lower than the first compression ratio, when the variable compression ratio mechanism is controlled so as to set the compression ratio of the internal combustion engine to the second compression ratio, the failure diagnosis apparatus advances the ignition timing of one cylinder to a knock inducing ignition timing more advanced than the MBT that does not lead to the occurrence of knock if the actual compression ratio of that cylinder is the second compression ratio but leads to the occurrence of knock if the actual compression ratio of that cylinder is the first compression ratio and diagnoses failure of the variable compression ratio mechanism on the basis of whether knock occurs or not. In this specification, the term "compression ratio" shall mean the mechanical compression ratio, unless stated otherwise.

More specifically, according to a first mode of the present disclosure, there is provided a failure diagnosis apparatus for a variable compression ratio mechanism for use in a spark-ignition internal combustion engine provided with a variable compression ratio mechanism capable of switching the compression ratio of the internal combustion engine having a plurality of cylinders between at least a first compression ratio and a second compression ratio lower than the first compression ratio and including a compression ratio changing mechanism provided in each of the cylinders of the internal combustion engine, a knock sensor attached to the internal combustion engine, and an ignition plug attached to each of the cylinders of the internal combustion engine. The failure diagnosis apparatus includes a controller comprising at least one processor configured to:

perform advancing process for diagnosis to advance the ignition timing of one cylinder of the internal combustion engine to a knock inducing ignition timing more advanced than the MBT (Minimum Advance for Best Torque) that does not lead to the occurrence of knock if the actual compression ratio of the one cylinder is the second compression ratio but leads to the occurrence of knock if the actual compression ratio of the one cylinder is the first compression ratio, when the variable compression ratio mechanism is controlled so as to set the compression ratio of the internal combustion engine to the second compression ratio; and diagnose that the compression ratio changing mechanism of the one cylinder of which the ignition timing is advanced to the knock inducing ignition timing is in failure, if the knock sensor detects the occurrence of knock when the advancing process for diagnosis is performed.

When the aforementioned advancing process for diagnosis is performed, knock will not occur if the compression ratio changing mechanism of the cylinder of which the ignition timing is advanced to the knock inducing ignition timing (which will be hereinafter referred to as the "target cylinder") is in a normal condition, namely if the actual compression ratio of that cylinder is the second compression ratio. On the other hand, if the compression ratio changing mechanism of the target cylinder is in failure, namely if the actual compression ratio of the target cylinder is the first compression ratio, when the advancing process for diagnosis is performed, knock will occur. Thus, when failure that prevents switching of the compression ratio from the first compression ratio to the second compression ratio occurs, the failure diagnosis apparatus for the variable compression ratio mechanism according to the present disclosure can identify the cylinder of which the compression ratio changing mechanism is in failure, utilizing an existing knock sensor.

When performing the advancing process for diagnosis, the controller may perform the process of setting the ignition timing of the cylinders other than the one cylinder to an ignition timing more retarded than the MBT in addition to the process of advancing the ignition timing of the one cylinder of the internal combustion engine to the knock inducing ignition timing.

When the ignition timing of the target cylinder is advanced to the knock inducing ignition timing more advanced than the MBT, the torque generated by the target cylinder becomes lower than the torque generated by the other cylinders, even if the compression ratio changing mechanism of the target cylinder is in a normal condition. In consequence, there arises a torque difference among the cylinders of the internal combustion engine. By retarding the ignition timing of the cylinders other than the target cylinder (which will be hereinafter referred to as the "non-target cylinders") to an ignition timing more retarded (or later) than the MBT, the torque generated by the non-target cylinders can be reduced. Thus, the torque difference among the cylinders of the internal combustion engine can be made small. Moreover, retarding the ignition timing of the non-target cylinders to an ignition timing more retarded than the MBT can prevent the occurrence of knock more reliably even if the compression ratio changing mechanism of any non-target cylinder is in failure, enabling more accurate failure diagnosis of the compression ratio changing mechanism of the target cylinder.

When the process of advancing the ignition timing of the target cylinder to the knock inducing ignition timing and the process of retarding the ignition timing of the non-target cylinders to an ignition timing more retarded than the MBT are performed in the advancing process for diagnosis, there is a possibility that the overall torque generated by the internal combustion engine may become lower than that during the time when the advancing process for diagnosis is not performed. To prevent this, the failure diagnosis apparatus may be configured to perform a torque compensation process to make the intake air quantity and the fuel injection quantity of the internal combustion engine larger when the advancing process for diagnosis is performed than when the advancing process for diagnosis is not performed. This can reduce the decrease in the overall torque of the internal combustion engine resulting from the advancing process for diagnosis.

According to a second mode of the present disclosure, there is provided a failure diagnosis apparatus for a variable compression ratio mechanism for use in a spark-ignition internal combustion engine provided with a variable compression ratio mechanism capable of switching the compression ratio of the internal combustion engine having a plurality of cylinders between at least a first compression ratio and a second compression ratio lower than the first compression ratio and including a compression ratio changing mechanism provided in each of the cylinders of the internal combustion engine, a knock sensor attached to the internal combustion engine, and an ignition plug attached to each of the cylinders of the internal combustion engine. The failure diagnosis apparatus includes a controller comprising at least one processor configured to:

perform advancing process for diagnosis to advance the ignition timing of one cylinder of the internal combustion engine to a knock inducing ignition timing more advanced than the MBT that leads to the occurrence of knock if the actual compression ratio of the one cylinder is the first compression ratio but does not lead to the occurrence of knock if the actual compression ratio of the one cylinder is the second compression ratio when the variable compression ratio mechanism is controlled so as to set the compression ratio of the internal combustion engine to the first compression ratio; and diagnose that the compression ratio changing mechanism of the one cylinder of which the ignition timing is advanced to the knock inducing ignition timing is in failure, if the knock sensor does not detect the occurrence of knock when the advancing process for diagnosis is performed.

The failure diagnosis apparatus as above can identify the cylinder of which the compression ratio changing mechanism is in failure utilizing an existing knock sensor, when failure that prevents switching of the compression ratio from the second compression ratio to the first compression ratio occurs.

The present disclosure enables detection of failure of a compression ratio changing mechanism in a variable compression ratio mechanism including a compression ratio changing mechanism provided for each of the cylinders.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless stated otherwise.

Embodiment 1

Figure 1:
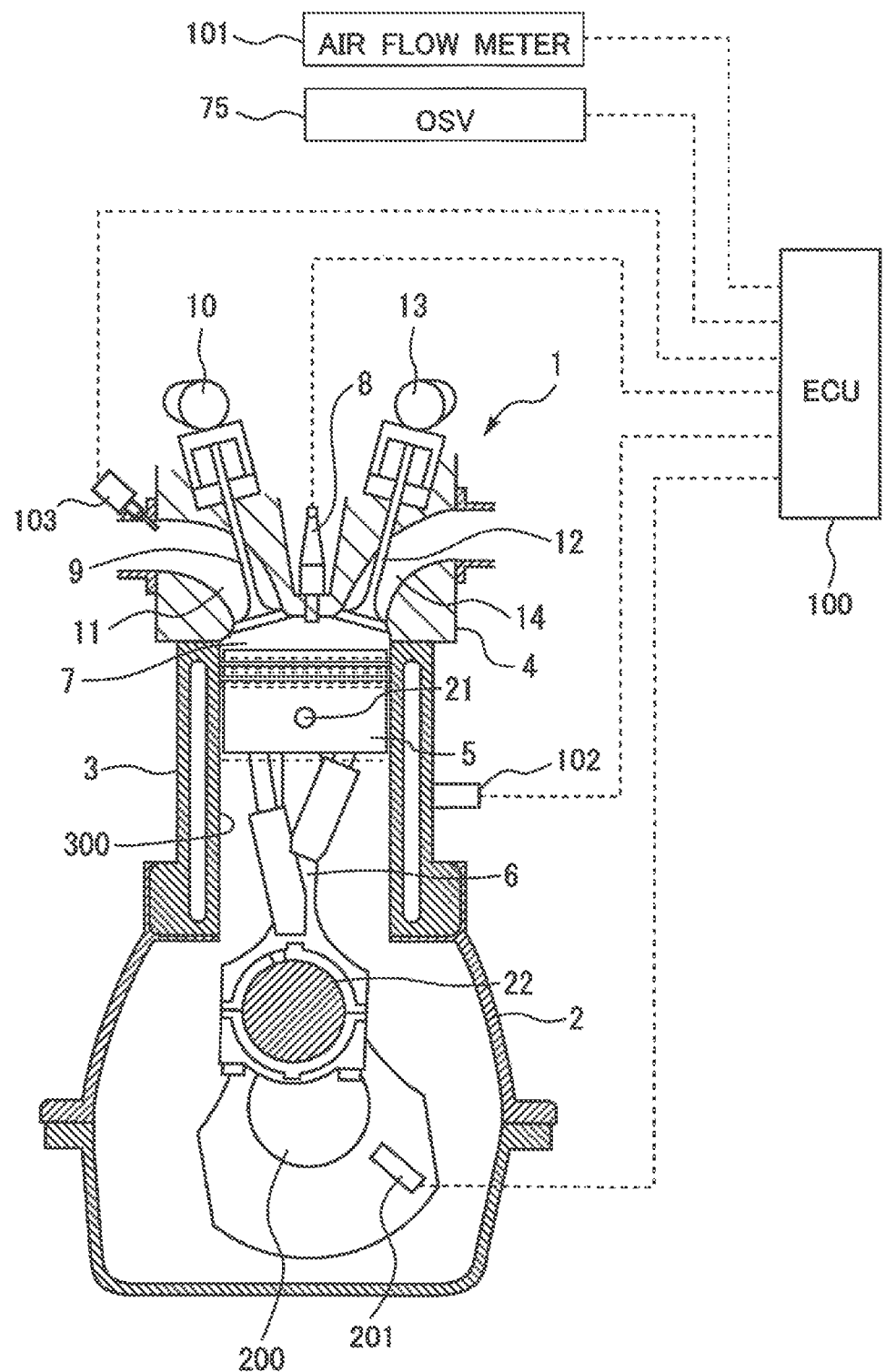
FIG. 1 is a diagram showing the general configuration of an internal combustion engine according to an embodiment.

A first embodiment of the present disclosure will be described with reference to FIGS. 1 to 7. FIG. 1 is a diagram showing the general configuration of an internal combustion engine to which the present disclosure is applied. The internal combustion engine 1 shown in FIG. 1 is a four-stroke-cycle spark-ignition internal combustion engine having a plurality of cylinders 300. FIG. 1 shows one of the plurality of cylinders 3.

The internal combustion engine 1 includes a crankcase 2, a cylinder block 3, and a cylinder head 4. A crankshaft 200 is housed in the crankcase 2 in a rotatable manner. A cylindrical cylinder 300 is formed in the cylinder block 3. A piston 5 is provided in the cylinder 300 in a slidable manner. The piston 5 and the crankshaft 200 are connected by a variable length connecting rod 6, which will be described later. The cylinder head 4 is provided with an intake port 11 and an exhaust port 14. The cylinder head 4 is equipped with an intake valve 9 that closes and opens the opening end of the intake port 11 of the combustion chamber 7 and an intake cam shaft 10 used to drive the intake valve 9 to open and close it. The cylinder head 4 is also equipped with an exhaust valve 12 that closes and opens the opening end of the exhaust port 14 of the combustion chamber 7 and an exhaust cam shaft 13 used to drive the exhaust valve 12 to open and close it. The cylinder head 4 is further equipped with an ignition plug 8 used to ignite air-fuel mixture in the combustion chamber 7 and a fuel injection valve 103 that injects fuel to the intake port 11.

The variable length connecting rod 6 is connected to a piston 5 by a piston pin 21 at its smaller end and connected to a crankpin 22 of the crankshaft 200 at its larger end. The variable length connecting rod 6 can change its effective length, that is, the distance from the axis of the piston pin 21 to the axis of the crankpin 22. When the effective length of the variable length connecting rod 6 is long, the length from the axis of the crankpin 22 to the axis of the piston pin 21 is long, and the volume of the combustion chamber 7 at the time when the piston 5 is located at the top dead center is small accordingly, as illustrated by solid lines in FIG. 1. On the other hand, when the effective length of the variable length connecting rod 6 is short, the length from the axis of the crankpin 22 to the axis of the piston pin 21 is short, and the volume of the combustion chamber 7 at the time when the piston 5 is at the top dead center is large accordingly, as illustrated by broken lines in FIG. 1. While the effective length of the variable length connecting rod 6 varies as described above, the stroke of the piston 5 does not vary. Hence, the mechanical compression ratio defined as the ratio of the inner volume of the cylinder (that is, the volume of the combustion chamber) at the time when the piston 5 is at the top dead center and the inner volume of the cylinder at the time when the piston 5 is at the bottom dead center varies. The mechanical compression ratio will be simply referred to as the compression ratio hereinafter.

(Structure of Variable Length Connecting Rod 6)

Figure 2:
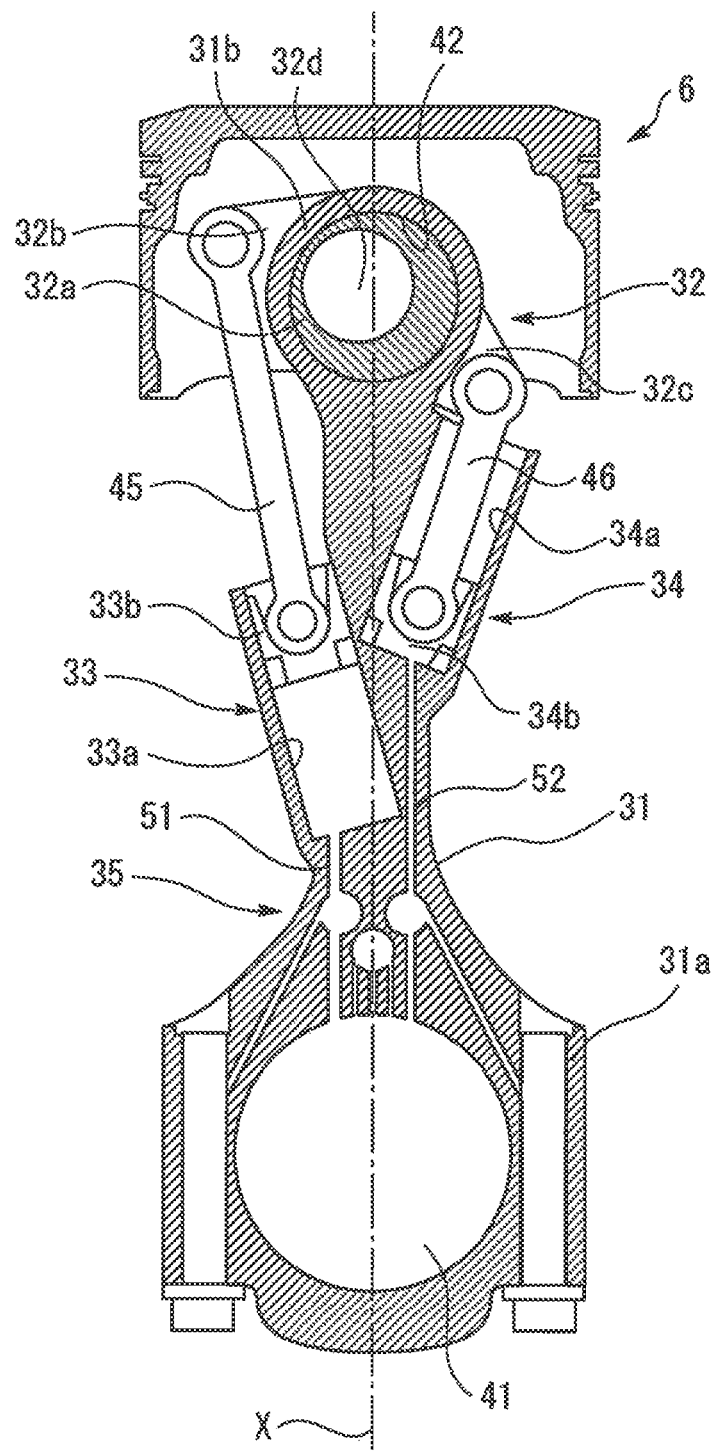
FIG. 2 is a cross sectional view showing the structure of a variable length connecting rod.

Now, the structure of the variable length connecting rod 6 in this embodiment will be described with reference to FIG. 2. The variable length connecting rod 6 includes a connecting rod main body 31, an eccentric member 32 rotatably attached to the connecting rod main body 31, a first piston mechanism 33 provided in the connecting rod main body 31, a second piston mechanism 34 provided in the connecting rod main body 31, and a switching system 35 that switches the flow of hydraulic oil to the piston mechanisms 33, 34.

The connecting rod main body 31 has a crank receiving bore 41 at one end, which receives the crankpin 22 of the crankshaft 200, and a sleeve receiving bore 42 at the other end, which receives a sleeve 32a of the eccentric member 32, which will be described later. Since the crank receiving bore 41 is larger than the sleeve receiving bore 42, the end of the connecting rod main body 31 that has the crank receiving bore 41 will be called the larger end 31a, and the end of the connecting rod main body 31 that has the sleeve receiving bore 42 will be called the smaller end 31b.

In this specification, a virtual straight line X passing through the center axis of the crank receiving bore 41 (namely, the center axis of the crankpin 22 received in the crank receiving bore 41) and the center axis of the sleeve receiving bore 42 (namely, the center axis of the sleeve 32a received in the sleeve receiving bore 42) will be referred to as the axis of the variable length connecting rod 6. The dimension of the variable length connecting rod 6 along the direction perpendicular to the axis X of the variable length connecting rod 6 and to the center axis of the crank receiving bore 41 will be called the width of the variable length connecting rod 6. The dimension of the variable length connecting rod 6 along the direction parallel to the center axis of the crank receiving bore 41 will be called the thickness of the variable length connecting rod 6.

The eccentric member 32 has a cylindrical sleeve 32a received in the sleeve receiving bore 42 of the connecting rod main body 31, a first arm 32b extending from the sleeve 32a in a first direction with respect to the width direction of the connecting rod main body 31, and a second arm 32c extending from the sleeve 32a in a second direction (nearly opposite to the aforementioned first direction) with respect to the width direction of the connecting rod main body 31. The sleeve 32a is rotatable in the sleeve receiving bore 42, and the eccentric member 32 is attached to the smaller end portion 31b of the connecting rod main body 31 in such a way as to be rotatable relative to the connecting rod main body 31 in the circumferential direction of the smaller end portion 31b.

The sleeve 32a of the eccentric member 32 has a piston pin receiving bore 32d that receives the piston pin 21. The piston pin receiving bore 32d has a cylindrical shape. The cylindrical piston pin receiving bore 32d is offset from the center axis of the sleeve 32a.

Since the center axis of the piston pin receiving bore 32d is offset from the center axis of the sleeve 32a, rotation of the eccentric member 32 causes the position of the piston pin receiving bore 32d in the sleeve receiving bore 42 to change. When the piston pin receiving bore 32d is located at the side of the sleeve receiving bore 42 near the larger end 31a, the effective length of the variable length connecting rod 6 is short. When the piston pin receiving bore 32d is located at the side of the sleeve receiving bore 42 away from the larger end 31a, the effective length of the variable length connecting rod 6 is long. Thus, the effective length of the variable length connecting rod 6 can be changed by rotating the eccentric member 32.

The first piston mechanism 33 includes a first cylinder 33a formed in the connecting rod main body 31 and a first piston 33b capable of sliding in the first cylinder 33a. The most part or entirety of the first cylinder 33a is located on the first arm 32b side of the axis X of the variable length connecting rod 6. The first cylinder 33a is oriented obliquely to the axis X at a certain angle so that the first cylinder 33a sticks out in the width direction of the connecting rod main body 31 as it extends toward the smaller end 31b of the connecting rod main body 31. The first cylinder 33a is in communication with the switching system 35 through an oil channel 51 (which will be hereinafter referred to as the "first PCO-channel 51").

The first piston 33b is connected to the first arm 32b of the eccentric member 32 by a first link member 45. The first piston 33b is rotatably connected to the first link member 45 by a pin. The first arm 32b is rotatably connected to the first link member 45 by a pin at its end opposite to the end at which it is connected to the sleeve 32a.

The second piston mechanism 34 includes a second cylinder 34a formed in the connecting rod main body 31 and a second piston 34b capable of sliding in the second cylinder 34a. The most part or entirety of the second cylinder 34a is located on the second arm 32c side of the axis X of the variable length connecting rod 6. The second cylinder 34a is oriented obliquely to the axis X at a certain angle so that the second cylinder 34a sticks out in the width direction of the connecting rod main body 31 as it extends toward the smaller end 31b of the connecting rod main body 31. The second cylinder 34a is in communication with the switching system 35 through an oil channel 52 (which will be hereinafter referred to as the "second PCO-channel 52").

The second piston 34b is connected to the second arm 32c of the eccentric member 32 by a second link member 46. The second piston 34b is rotatably connected to the second link member 46 by a pin. The second arm 32c is rotatably connected to the second link member 46 by a pin at its end opposite to the end at which it is connected to the sleeve 32a.

As will be described later, the switching system 35 is a system that enables switching between a first state in which the flow of hydraulic oil from the first cylinder 33a to the second cylinder 34a is shut off and the flow of hydraulic oil from the second cylinder 34a to the first cylinder 33a is allowed and a second state in which the flow of hydraulic oil from the first cylinder 33a to the second cylinder 34a is allowed and the flow of hydraulic oil from the second cylinder 34a to the first cylinder 33a is shut off.

When the switching system 35 is in the aforementioned first state, the hydraulic oil is supplied into the first cylinder 33a, and the hydraulic oil is discharged from the second cylinder 34a. Consequently, the first piston 33b moves up, and the first arm 32b of the eccentric member 32 connected to the first piston 33b also moves up accordingly. On the other hand, the second piston 34b moves down, and the second arm 32c connected to the second piston 34b also moves down accordingly. In consequence, the eccentric member 32 turns in the clockwise direction in FIG. 2, so that the piston pin receiving bore 32d shifts away from the crankpin 22. In other words, the effective length of the variable length connecting rod 6 becomes longer. As the second piston 34b abuts the bottom of the second cylinder 34a, the turn of the eccentric member 32 is restricted, and the rotational position of the eccentric member 32 is maintained at that position. This position will be hereinafter referred to as the "high compression ratio position". In the following, the compression ratio in the state in which the switching system 35 is in the aforementioned first state (namely the eccentric member 32 is at the aforementioned high compression ratio position) will be referred to as the "first compression ratio".

When the switching system 35 is in the first state, the first piston 33b and the second piston 34b move to the aforementioned positions (i.e. the positions that are assumed when the second piston 34b abuts the bottom of the second cylinder 34a) basically without external supply of hydraulic oil. This is because when an upward inertial force acts on the piston 5 during the reciprocation of the piston 5 in the cylinder 300 of the internal combustion engine 1, the second piston 34b is pushed in, whereby the hydraulic oil in the second cylinder 34a is transferred to the first cylinder 33a. When a downward inertial force acts on the piston 5 during the reciprocation of the piston 5 in the cylinder 300 of the internal combustion engine 1 or when a downward force acts on the piston 5 by combustion of air-fuel mixture in the combustion chamber 7, a force acts on the first piston 33b in the pushing-in direction. However, since the flow of the hydraulic oil from the first cylinder 33a to the second cylinder 34a is shut off by the switching system 35, the hydraulic oil in the first cylinder 33a does not flow out of it. Hence, the first piston 33b is not pushed in.

When the switching system 35 is in the second state, the hydraulic oil is supplied into the second cylinder 34a and discharged from the first cylinder 33a. Consequently, the second piston 34b moves up, and the second arm 32c of the eccentric member 32 connected to the second piston 34b also moves up accordingly. On the other hand, the first piston 33b moves down, and the first arm 32b connected to the first piston 33b also moves down. In consequence, the eccentric member 32 turns in the anticlockwise direction in FIG. 2, so that the piston pin receiving bore 32d shifts toward the crankpin 22. In other words, the effective length of the variable length connecting rod 6 becomes shorter. As the first piston 33b abuts the bottom of the first cylinder 33a, the turn of the eccentric member 32 is restricted, and the rotational position of the eccentric member 32 is maintained at that position. This position will be hereinafter referred to as the "low compression ratio position". Thus the compression ratio of the internal combustion engine 1 is lower when the switching system 35 is in the aforementioned second state than when it is in the aforementioned first state. In the following, the compression ratio in the state in which the switching system 35 is in the aforementioned second state (in which the eccentric member 32 is at the aforementioned low compression ratio position) will be referred to as the "second compression ratio". As described above, the second compression ratio is lower than the first compression ratio.

When the switching system 35 is in the second state, the first piston 33b and the second piston 34b move to the aforementioned positions (i.e. the positions that are assumed when the first piston 33b abuts the bottom of the first cylinder 33a) basically without external supply of hydraulic oil. This is because when a downward inertial force acts on the piston 5 during the reciprocation of the piston 5 in the cylinder 300 of the internal combustion engine 1 or when a downward force acts on the piston 5 by combustion of air-fuel mixture in the combustion chamber 7, the first piston 33b is pushed in, whereby the hydraulic oil in the first cylinder 33a is transferred to the second cylinder 34a. When an upward inertial force acts on the piston 5 during the reciprocation of the piston 5 in the cylinder 300 of the internal combustion engine 1, a force acts on the second piston 34b in the pushing-in direction. However, since the flow of the hydraulic oil from the second cylinder 34a to the first cylinder 33a is shut off by the switching system 35, the hydraulic oil in the second cylinder 34a does not flow out of it. Hence, the second piston 34b is not pushed in.

(Structure of the Switching System)

Figure 3:
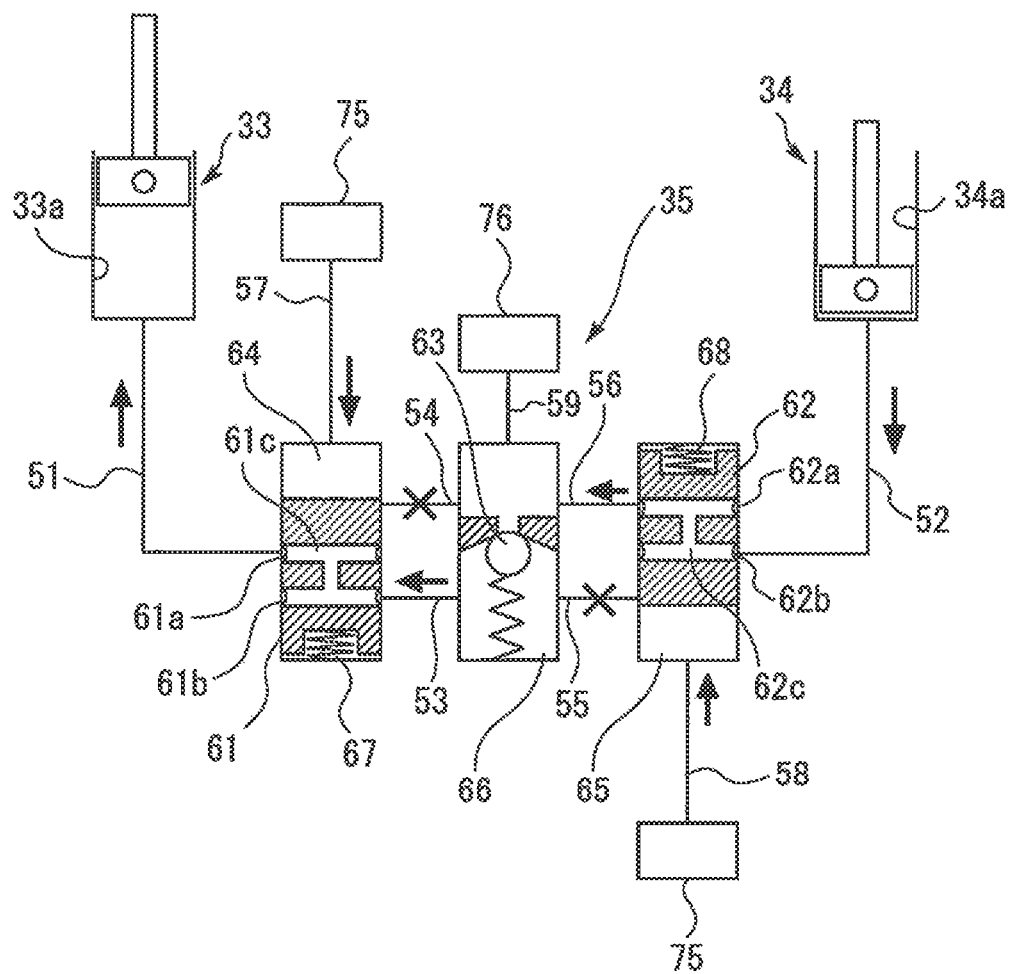
FIG. 3 is a diagram schematically illustrating the configuration of a switching system.
Figure 4:
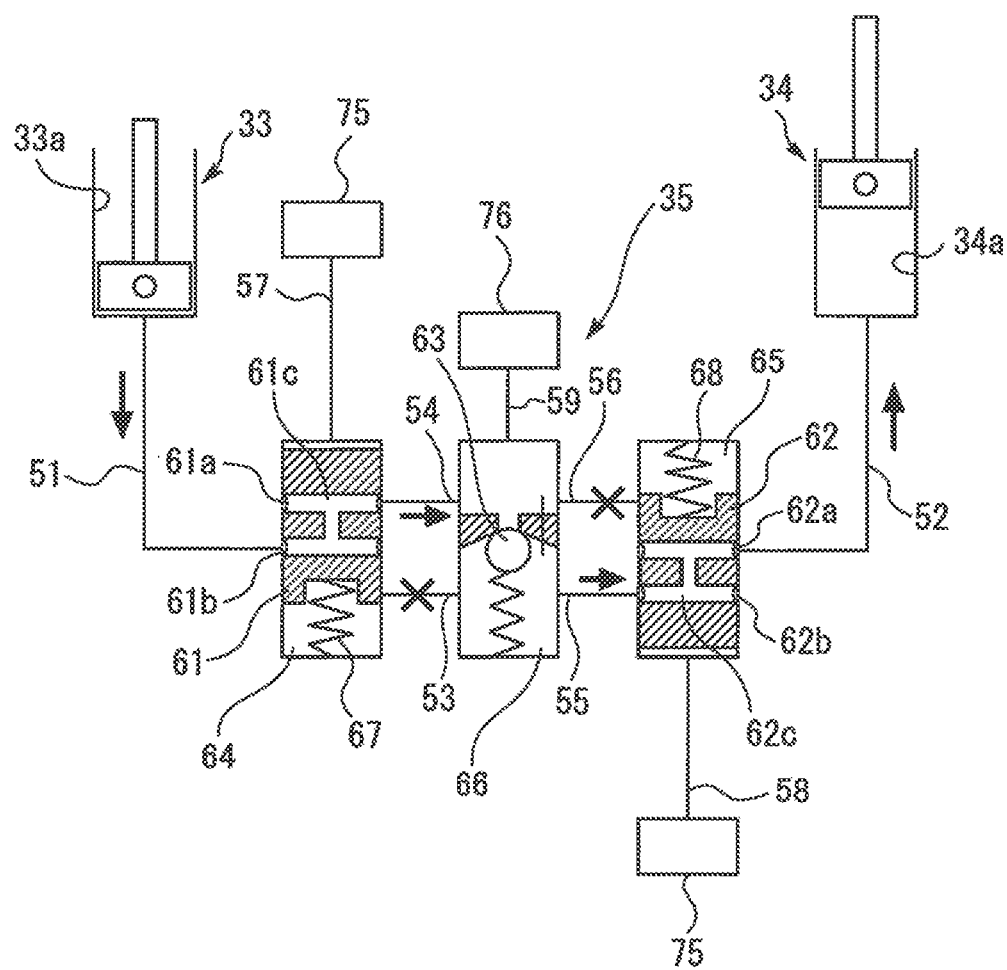
FIG. 4 is a diagram schematically illustrating the switching system in a second state.

An embodiment of the switching system will be described with reference to FIGS. 3 and 4. FIG. 3 shows the switching system 35 in the first state, and FIG. 4 shows the switching system 35 in the second state. The switching system 35 includes two switching pins 61, 62 and a check valve 63. The two switching pins 61 and 62 are slidably housed in cylindrical pin housing spaces 64 and 65 respectively. The arrows in FIGS. 3 and 4 indicate the flows of the hydraulic oil in the first state and the second state.

A first switching pin 61 among the aforementioned two switching pins 61, 62 has two circumferential grooves 61a, 61b extending along its circumference. The circumferential grooves 61a, 61b are in communication with each other through a communication channel 61c formed in the first switching pin 61. In the first pin housing space 64, in which the first switching pin 61 is housed, a first bias spring 67 that biases the first switching pin 61 in the direction from one end of the first pin receiving space 64 to the other end (i.e. from the lower end to the upper end in FIG. 3) is also provided.

The second switching pin 62 among the aforementioned two switching pins 61, 62 also has two circumferential grooves 62a, 62b extending along its circumference. The circumferential grooves 62a, 62b are in communication with each other through a communication channel 62c formed in the second switching pin 62. In the second pin housing space 65, in which the second switching pin 62 is housed, a second bias spring 68 that biases the second switching pin 62 in the direction from one end of the second pin receiving space 65 to the other end (i.e. from the upper end to the lower end in FIG. 3) is also provided.

The check valve 63 is housed in a check valve housing space 66 having a cylindrical shape. The check valve 63 is adapted to allow the fluid flow from the primary or upstream side (i.e. the upper side in FIG. 3) to the secondary or downstream side (i.e. the lower side in FIG. 3) and to interrupt the fluid flow from the secondary side to the primary side.

The first pin housing space 64 in which the first pin 61 is housed is in communication with the first cylinder 33a through the first PCO-channel 51. The first pin housing space 64 is in communication with the check valve housing space 66 through two oil channels 53, 54. One of the two oil channels, or the oil channel 53 (which will be hereinafter referred to as the "first SCO-channel 53"), provides communication between the first pin housing space 64 and the secondary side of the check valve housing space 66. The other of the two oil channels, or the oil channel 54 (which will be hereinafter referred to as the "second SCO-channel 54"), provides communication between the first pin housing space 64 and the primary side of the check valve housing space 66.

The second pin housing space 65 in which the second pin 62 is housed is in communication with the second cylinder 34a through the second PCO-channel 52. The second pin housing space 65 is in communication with the check valve housing space 66 through two oil channels 55, 56. One of the two oil channels, or the oil channel 55 (which will be hereinafter referred to as the "third SCO-channel 55"), provides communication between the second pin housing space 65 and the secondary side of the check valve housing space 66. The other of the two oil channels, or the oil channel 56 (which will be hereinafter referred to as the "forth SCO-channel 56"), provides communication between the second pin housing space 65 and the primary side of the check valve housing space 66.

The first pin housing space 64 is in communication with a first control oil channel 57 formed in the connecting rod main body 31. Specifically, the first control oil channel 57 is in communication with the first pin housing space 64 at its end (the upper end in FIG. 3) opposite to the end (the lower end in FIG. 3) at which the first bias spring 67 is provided. The second pin housing space 65 is in communication with a second control oil channel 58 formed in the connecting rod main body 31. Specifically, the second control oil channel 58 is in communication with the second pin housing space 65 at its end (the lower end in FIG. 3) opposite to the end (the upper end in FIG. 3) at which the second bias spring 68 is provided. The first control oil channel 57 and the second control oil channel 58 are in communication with the crank receiving bore 41 and with an external oil switching valve (OSV) 75 through an oil channel (not shown) formed in the crank pin 22. The OSV 75 is a valve system that enables switching between communication and interruption between the two control oil channels 57, 58 and an oil pump that is not shown in the drawings.

The primary side of the check valve housing space 66 is in communication with a hydraulic oil source 76 such as an oil pump through an additional oil channel 59. The additional oil channel 59 is an oil channel though which oil is added to compensate for oil leaking from some portions of the switching system 35 to the outside.

(Operation of the Switching System 35)

In the above-described switching system 35, when the OSV 75 allows the communication between the control oil channels 57, 58 and the oil pump, the biasing springs 67, 68 are compressed by the hydraulic pressure acting on the switching pins 61, 62, so that the switching pins 61, 62 are brought to and kept at positions that allow communication between the first PCO-channel 51 and the first SCO-channel 53 through the communication channel 61c of the first switching pin 61 and communication between the second PCO-channel 52 and the fourth SCO-channel 56 through the communication channel 62c of the second switching pin 62, as shown in FIG. 3. Thus, the first cylinder 33a is connected to the secondary side of the check valve 63, and the second cylinder 34a is connected to the primary side of the check valve 63. In consequence, while the hydraulic oil in the second cylinder 34a can be transferred to the first cylinder 33a through the second PCO-channel 52, the fourth SCO-channel 56, the first SCO-channel 53, and the first PCO-channel 51, the hydraulic oil in the first cylinder 33a cannot be transferred to the second cylinder 34a. Hence, when the OSV 75 keeps the control oil channels 57, 58 and the oil pump in communication with each other, the state (or the first state) in which the flow of the hydraulic oil from the first cylinder 33a to the second cylinder 34a is shut off and the flow of the hydraulic oil from the second cylinder 34a to the first cylinder 33a is allowed is established.

When the OSV 75 interrupts the communication between the control oil channels 57, 58 and the oil pump, only the biasing force of the bias springs 67, 68 acts on the switching pins 61, 62, so that the switching pins 61, 62 are brought to and kept at positions that allow communication between the first PCO-channel 51 and the second SCO-channel 54 through the communication channel 61c of the first switching pin 61 and communication between the second PCO-channel 52 and the third SCO-channel 55 through the communication channel 62c of the second switching pin 62, as shown in FIG. 4. Thus, the first cylinder 33a is connected to the primary side of the check valve 63, and the second cylinder 34a is connected to the secondary side of the check valve 63. In consequence, while the hydraulic oil in the first cylinder 33a can be transferred to the second cylinder 34a through the first PCO-channel 51, the second SCO-channel 54, the third SCO-channel 55, and the second PCO-channel 52, the hydraulic oil in the second cylinder 34a cannot be transferred to the first cylinder 33a. Hence, when the OSV 75 interrupts the communication between the control oil channels 57, 58 and the oil pump, the state (or the second state) in which the flow of the hydraulic oil from the first cylinder 33a to the second cylinder 34a is allowed and the flow of the hydraulic oil from the second cylinder 34a to the first cylinder 33a is shut off is established.

As described above, switching by the OSV 75 between supply of hydraulic oil to the first pin housing space 64 and second pin housing space 65 and its interruption enables switching between the first state and the second state of the switching system. Thus, the compression ratio of the internal combustion engine 1 can be selectively set to either the first compression ratio or the second compression ratio. A plurality of OSV 75 may be provided for the switching systems of the respective cylinders 300, or only one OSV 75 may be provided for the switching systems 35 of all the cylinders 300.

The variable length connecting rod 6 of each cylinder 300 and the OSV 75 altogether constitute the variable compression ratio mechanism according to the present disclosure.

Referring back to FIG. 1, an ECU 100 is provided for the internal combustion engine 1 having the above-described configuration. The ECU 100 is an electronic control unit composed of a CPU, a ROM, a RAM, and a backup RAM etc. The ECU 100 is electrically connected with various sensors including an air flow meter 101, a knock sensor 102, and a crank position sensor 201 and can receives signals output from these sensors. The air flow meter 101 is a sensor that is attached to the intake passage (not shown) of the internal combustion engine 1 and outputs an electrical signal representing the intake air quantity. The knock sensor 102 is a sensor that is attached to the cylinder block 3 of the internal combustion engine 1 and outputs a sensor signal (e.g. voltage) that changes responsive to the magnitude of vibration of the internal combustion engine 1. The crank position sensor 201 is a sensor that outputs an electrical signal representing the rotational position of the crankshaft 200.

The ECU 100 is electrically connected with various components including the ignition plug 8, the fuel injection valve 103, and the OSV 75 as well as the above-mentioned sensors. The ECU 100 controls the above-mentioned components taking account of the output signals of the above-mentioned sensors. For example, the ECU 100 determines a target air-fuel ratio of the air-fuel mixture on the basis of the engine speed calculated on the basis of the output signal of the crank position sensor 201 and the engine load factor (which is the ratio of the actual intake air quantity to the intake air quantity at full load) calculated on the basis of the output signal of the air flow meter 101 (intake air quantity). The ECU 100 calculates a target fuel injection quantity of the fuel injection valve 103 on the basis of the aforementioned target air-fuel ratio and the output signal of the air flow meter 101 (intake air quantity) and controls the fuel injection valve 103 in accordance with the target fuel injection quantity thus calculated.

The ECU 100 calculates a target injection timing of the ignition plug 8 on the basis of the engine speed and the engine load. When the engine operation state determined by the engine speed and the engine load falls in the MBT operation range, the ECU 100 sets the target ignition timing to the MBT. The MBT operation range mentioned above is the operation range in which the MBT is later than the knock limit ignition timing. On the other hand, when the engine operation state determined by the engine speed and the engine load falls out of the MBT operation range, the ECU 100 sets the target ignition timing to the knock limit ignition timing. The knock limit ignition timing mentioned above is the most advanced or earliest ignition timing in the range of ignition timing in which knock will not occur. The relationship between the engine speed, the engine load, and the MBT operation range is determined in advance by, for example, experiment.

The ECU 100 controls the OSV 75 according to the engine load factor. Specifically, when the engine load factor is lower than a predetermined threshold, the ECU 100 controls the OSV 75 in such a way as to set the compression ratio of the internal combustion engine 1 to the aforementioned first compression ratio (or to set the switching system 35 to the first state). When the engine load factor is equal to or higher than the aforementioned predetermined threshold, the ECU 100 controls the OSV 75 in such a way as to set the compression ratio of the internal combustion engine 1 to the second compression ratio lower than the first compression ratio (or to set the switching system 35 to the second state).

If failure occurs in a hydraulic oil channel or other portion of the variable compression ratio mechanism, various faults may occur due to incapability in switching the compression ratio. In particular, if the eccentric member 32 of the variable length connecting rod 6 is fixed at the high compression ratio position or the switching system 35 is fixed in the first state due to failure, the compression ratio cannot be changed from the first compression ratio to the second compression ratio when the engine load factor is equal to or higher than the aforementioned predetermined threshold. Then, abnormal combustion of the air-fuel mixture may result.

To diagnose failure of the variable length compression ratio mechanism, a compression ratio sensor may be attached to the internal combustion engine 1 to determine the actual compression ratio. However, in the case of the variable compression ratio mechanism in which the compression ratio changing mechanism (i.e. the variable length connecting rod 6) is provided in each of the cylinders 300, as is the case with the variable compression ratio mechanism according to this embodiment, it is necessary to provide a compression ratio sensor for each of the cylinders 300. This undesirably leads to an increase in the number of components and an increase in the manufacturing cost. Moreover, there is another problem that it is not possible for this method to distinguish failure of the compression ratio measuring sensor and failure of the compression ratio changing mechanism from each other.

(Diagnosis of Failure of the Variable Compression Ratio Mechanism)

In this embodiment, failure of the compression ratio changing mechanism of each cylinder 300 is diagnosed utilizing the existing knock sensor 102. Specifically, when the operation state of the internal combustion engine 1 falls within the aforementioned MBT operation range and the engine load factor is equal to or higher than the aforementioned predetermined threshold (namely, the OSV 75 is controlled so as to set the compression ratio to the second compression ratio), the process of advancing the ignition timing of only one of the cylinders 300 (target cylinder) of the internal combustion engine 1 to a knock inducing ignition timing more advanced than the MBT is performed. This process will be referred to as "advancing process for diagnosis".

The knock inducing ignition timing mentioned above is such ignition timing more advanced than the MBT that does not lead to the occurrence of knock if the actual compression ratio of the target cylinder is equal to the second compression ratio but leads to the occurrence of knock if the actual compression ratio of the target cylinder is equal to the first compression ratio. In other words, the knock inducing ignition timing is an ignition timing more advanced than the knock limit ignition timing in the case where the compression ratio is equal to the first compression ratio and more retarded than the knock limit ignition timing in the case where the compression ratio is equal to the second compression ratio. The knock inducing ignition timing as such is a value determined in advance by, for example, experiment or simulation.

If the actual compression ratio of the target cylinder is equal to the second compression ratio when the advancing process for diagnosis is performed by the above-described method, knock will not occur. On the other hand, if the actual compression ratio of the target cylinder is equal to the first compression ratio when the advancing process for diagnosis is performed, knock will occur. Therefore, if the knock sensor 102 does not detect knock while the advancing process for diagnosis is performed, the ECU 100 may diagnose that the compression changing mechanism of the target cylinder is in a normal condition, and if the knock sensor 102 detects knock while the advancing process for diagnosis is performed, the ECU 100 may diagnose that the compression changing mechanism of the target cylinder is in failure.

If the ignition timing of the target cylinder is advanced to the knock inducing ignition timing in the MBT operation range, a torque difference among the cylinders of the internal combustion engine 1 occurs even if the compression changing mechanism of the target cylinder is in a normal condition, because the torque generated by the target cylinder becomes smaller than the torque generated by the other cylinders 300 (non-target cylinders). In the advancing process for diagnosis according to this embodiment, the process of retarding the ignition timing of the non-target cylinders to an ignition timing more retarded than the MBT is also performed in addition to the process of advancing the ignition timing of the target cylinder to the knock inducing ignition timing. This ignition timing of the non-target cylinders will be hereinafter referred to as the "torque reducing ignition timing".

Figure 5:
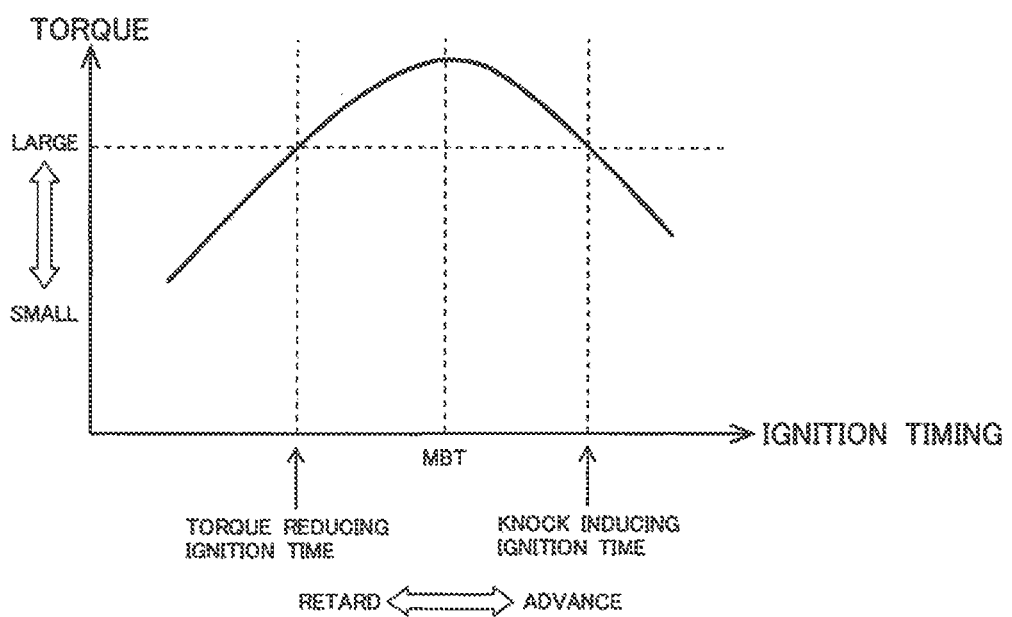
FIG. 5 is a graph showing relationship between the ignition timing and the torque generate by a cylinder.

The aforementioned torque reducing ignition timing is an ignition timing that makes the torque generated by the non-target cylinders equal to the torque generated by the target cylinder if the compression ratio changing mechanisms of all the cylinders 300 are normal. FIG. 5 is a graph showing relationship between the ignition timing and the torque generated by a cylinder 300 of which the compression ratio changing mechanism is in a normal condition. As shown in FIG. 5, since the torque generated by the cylinder 300 is largest when the ignition timing is set to the MBT, the torque generated by the cylinder 300 is smaller when the ignition timing is set to the knock inducing ignition timing more advanced than the MBT than when the ignition timing is set to the MBT. In the case where the ignition timing is more retarded than the MBT, the larger the amount of retard from the MBT is, the smaller the torque generated by the cylinder 300 is. Therefore, if the ignition timing of the non-target cylinders is set to the torque reducing ignition timing more retarded than the MBT that makes the generated torque equal to the torque generated in the case where the ignition timing is set to the knock inducing ignition timing, the difference between the torque generated by the target cylinder and the torque generated by the non-target cylinders can be made small. In consequence, the torque difference among the cylinders due to the execution of the advancing process for diagnosis can be made small. Moreover, if the ignition timing of the non-target cylinders is retarded to the torque reducing ignition timing more retarded than the MBT, the occurrence of knock can be prevented more reliably, even if the compression ratio changing mechanism is in failure in any non-target cylinder. Therefore, failure diagnosis of the compression ratio changing mechanism of the target cylinder can be carried out with higher accuracy.

If the ignition timing of the target cylinder is set to the knock inducing ignition timing and the ignition timing of the non-target cylinders is set to the torque reducing ignition timing when the advancing process for diagnosis is performed, the overall torque generated by the internal combustion engine 1 becomes smaller than the required torque. In view of this, the system of this embodiment is configured to perform the process of making the intake air quantity of the internal combustion engine 1 larger when the advancing process for diagnosis is performed than when the advancing process for diagnosis is not performed. This process will be referred to as the "torque compensation process". Specifically, the ECU 100 increases the degree of opening of a throttle valve (not shown) to increase the intake air quantity of the internal combustion engine 1. Since the fuel injection quantity of the internal combustion engine 1 is determined according to the target air-fuel ratio and the intake air quantity, increasing the intake air-quantity necessitates an increase in the fuel injection quantity. Consequently, the torque generated by the internal combustion engine 1 becomes larger when the aforementioned torque compensation process is performed than when it is not performed. Therefore, the torque compensation process performed during the advancing process for diagnosis can reduce the decrease in the overall torque generated by the internal combustion engine 1. The amount of increase of the intake air quantity during the torque compensation process is determined in advance by experiment or simulation.

Figure 6:
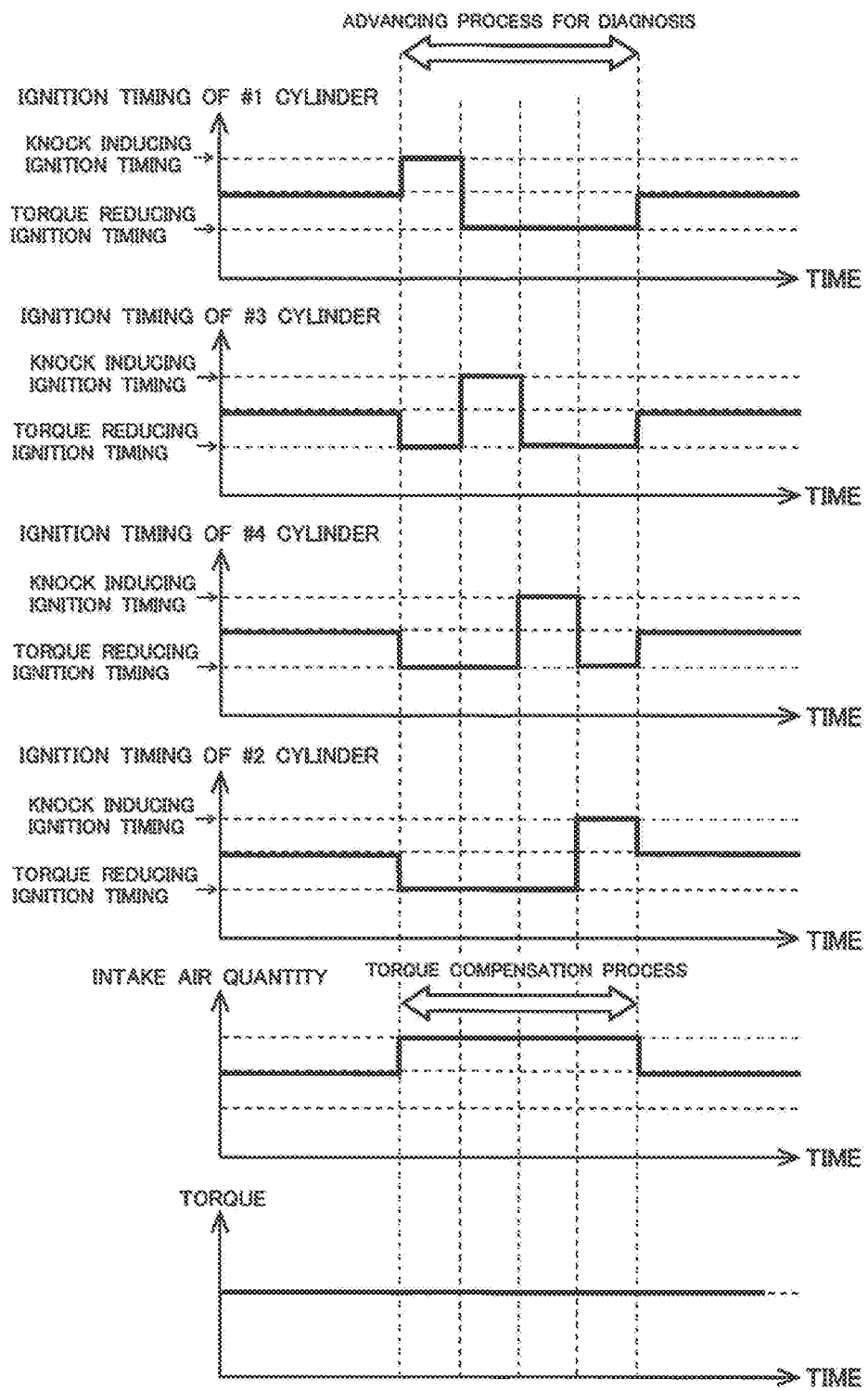
FIG. 6 is a timing chart showing the changes with time of the ignition timings of the cylinders, the intake air quantity, and the torque generated by the internal combustion engine during advancing process for diagnosis.

By the failure diagnosis of the variable compression ratio mechanism performed as above, diagnosis of failure of the compression ratio changing mechanism of the target cylinder can be made with a reduced torque difference among the cylinders and with a reduced decrease in the overall torque of the internal combustion engine 1. The advancing process for diagnosis by the above-described method is to be performed successively for all the cylinders 300 of the internal combustion engine 1. FIG. 6 is a timing chart showing the change with time of the ignition timing of the cylinders 300, the intake air quantity, and the torque generated by the internal combustion engine 1, in a case where the advancing process for diagnosis is performed successively for all the cylinders of the internal combustion engine 1. FIG. 6 shows a case where the internal combustion engine 1 has four cylinders 300 and the target cylinder is changed in accordance with the order of ignition of the cylinders 300 (i.e. in the order of #1-#3-#4-#2 cylinders).

Referring to FIG. 6, the ECU 100 firstly starts the advancing process for diagnosis by setting the ignition timing of the #1 cylinder to the knock inducing ignition timing and setting the ignition timing of the other cylinders to the torque reducing ignition timing and starts the torque compensation process for increasing the intake air quantity. After performing the advancing process for diagnosis for the #1 cylinder as the target cylinder for a predetermined period of time, the ECU 100 changes the target cylinder from the #1 cylinder to the #3 cylinder to perform the advancing process for diagnosis for the #3 cylinder. After performing the advancing process for diagnosis for the #3 cylinder as the target cylinder for a predetermined period of time, the ECU 100 changes the target cylinder from the #3 cylinder to the #4 cylinder to perform the advancing process for diagnosis for the #4 cylinder. After performing the advancing process for diagnosis for the #4 cylinder as the target cylinder for a predetermined period of time, the ECU 100 changes the target cylinder from the #4 cylinder to the #2 cylinder and performs the advancing process for diagnosis for the #2 cylinder. After performing the advancing process for diagnosis for the #2 cylinder as the target cylinder for a predetermined period of time, the ECU 100 sets the ignition timing of all the cylinders back to the MBT to terminate the advancing process for diagnosis and changes the intake air quantity back to the normal intake air quantity to terminate the torque compensation process. The aforementioned predetermined period of time is a period long enough to enable accurate detection of knock resulting from failure of the compression ratio changing mechanism can be detected with high accuracy if the compression ratio changing mechanism of the target cylinder is in failure. This period is determined in advance by experiment or simulation.

By performing the advancing process for diagnosis for all the cylinders 300 of the internal combustion engine 1 and the torque compensation process according to the sequence shown in FIG. 6, the cylinder 300 of which the compression ratio changing mechanism is in failure can be identified with a reduced torque difference among the cylinders and with a reduced decrease in the overall torque of the internal combustion engine 1, when failure that prevents switching of the compression ratio from the first compression ratio to the second compression ratio (or failure that fixes the compression ratio to the first compression ratio) occurs in the compression ratio changing mechanism of any cylinder 300 of the internal combustion engine 1.

Figure 7:
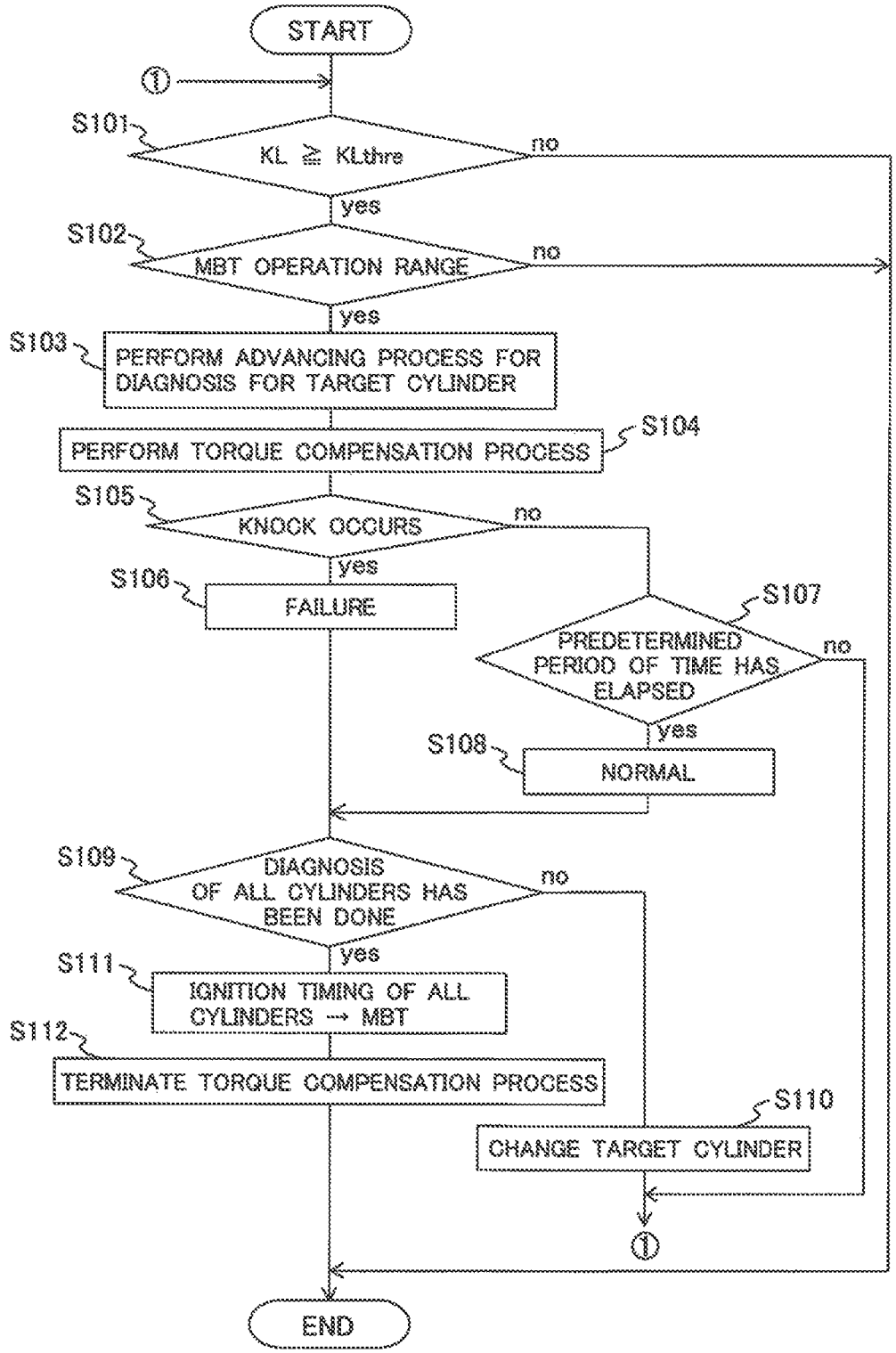
FIG. 7 is a flow chart of a processing routine executed by an ECU when performing failure diagnosis of a variable compression ratio mechanism according to a first embodiment.

In the following the process of performing the failure diagnosis of the variable compression ratio mechanism according to this embodiment will be described with reference to FIG. 7. FIG. 7 is a flow chart of a processing routine executed by the ECU 100 when performing the failure diagnosis of the variable compression ratio mechanism.

In the processing routine of FIG. 7, first in the processing of step S101, the ECU 100 calculates the engine load factor KL on the basis of the output signal of the air flow meter 101 and determines whether or not the calculated engine load factor KL is equal to or larger than the aforementioned predetermined threshold KLthre. If the determination made in the processing of step S101 is negative, the switching systems 35 of the cylinders 300 are controlled to be in the aforementioned first state (in which the compression ratio is set to the first compression ratio). Then, the ECU 100 terminates the execution of this processing routine without performing the advancing process for diagnosis. On the other hand, if the determination made in the processing of step S101 is affirmative, the switching systems 35 of the cylinders 300 are controlled to be in the aforementioned second state (in which the compression ratio is set to the second compression ratio). Then, the ECU 100 executes the processing of step S102 next.

In the processing of step S102, the ECU 100 determines whether or not the operation state of the internal combustion engine 1 falls in the MBT operation range. If the determination made in the processing of step S102 is negative, the ECU 100 terminates the execution of this processing routine without performing the advancing process for diagnosis. On the other hand, if the determination made in the processing of step S102 is affirmative, the ECU 100 executes the processing of step S103 next.

In the processing of step S103, the ECU 100 performs the advancing process for diagnosis by setting the ignition timing of the target cylinder to the aforementioned knock inducing ignition timing and setting the ignition timing of the non-target cylinders to the aforementioned torque reducing ignition timing.

In the processing of step S104, the ECU 100 performs the torque compensation process by increasing the intake air quantity of the internal combustion engine 1 and increasing the fuel injection quantity accordingly.

In the processing of step S105, the ECU 100 determines whether or not knock occurs on the basis of the output signal of the knock sensor 102. If the determination made in the processing of step S105 is affirmative, the ECU 100 executes the processing of step S106 next, where the ECU 100 determines that the compression ratio changing mechanism of the target cylinder is in failure. On the other hand, if the determination made in the processing of step S105 is negative, the ECU 100 executes the processing of step S107 next, where the ECU 100 determines whether or not a predetermined period of time has elapsed from the start of the advancing process for diagnosis for the target cylinder. If the determination made in the step S107 is negative, the ECU 100 returns to the processing of step S101. If the determination made in step S107 is affirmative, the ECU 100 executes the processing of step S108, where the ECU 100 determines that compression ratio changing mechanism of the target cylinder is in a normal condition.

After the completion of the execution of the processing of step S106 or S108, the ECU 100 executes the processing of step S109, where the ECU 100 determines whether or not the advancing process for diagnosis has been performed for all the cylinders 300 of the internal combustion engine 1. If the determination made in the processing of step S109 is negative, the ECU 100 executes the processing of step S110 next, where the ECU 100 changes the target cylinder and returns to the processing of step S101. On the other hand, if the determination made in step S109 is affirmative, the ECU 100 executes the processing of step S111 next, where the ECU 100 changes the ignition timing of all the cylinders 300 of the internal combustion engine 1 back to the MBT to terminate the advancing process for diagnosis. Then, the ECU 100 executes the processing of step S112 next, where the ECU 100 changes the intake air quantity of the internal combustion engine 1 back to the normal intake air quantity to terminate the torque compensation process.

The execution of the processing routine shown in FIG. 7 by the ECU 100 embodies the failure diagnosis apparatus according to the present disclosure. Thus, when failure that prevents switching of the compression ratio from the first compression ratio to the second compression ratio occurs in the compression ratio changing mechanism of any cylinder 300 of the internal combustion engine 1, the cylinder 300 of which the compression ratio changing mechanism is in failure can be identified with a reduced torque difference among the cylinders and with a reduced decrease in the overall torque of the internal combustion engine 1. Since the failure diagnosis of the variable compression ratio mechanism can be performed utilizing the existing knock sensor 102, it does not require additional components.

In the above-described failure diagnosis of the variable compression ratio mechanism, if failure in the compression ratio changing mechanism of any cylinder 300 of the internal combustion engine 1 is detected, the ignition timing of the cylinder 300 of which the compression ratio changing mechanism is in failure may be set to a timing later (or more retarded) than the knock limit ignition timing corresponding to the first compression ratio. This enables the vehicle equipped with the internal combustion engine 1 to travel in the limp home mode (or safe mode) while preventing the occurrence of knock due to the failure of the compression ratio changing mechanism after the failure of the compression ratio changing mechanism has been detected. If the ignition timing of the cylinder 300 of which the compression ratio changing mechanism is in failure is set to a timing later than the knock limit ignition timing corresponding to the first compression ratio, the overall torque generated by the internal combustion engine 1 decreases. Then, the intake air quantity of the internal combustion engine 1 may be increased. This reduces the deterioration of the drivability of the vehicle equipped with the internal combustion engine 1 in travelling in the limp home mode.

Embodiment 2

A second embodiment of the present disclosure will be described with reference to FIG. 8. In the following description, only features different from those in the above-described first embodiment will be described, and like features will not be described.

While in the first embodiment a method of detecting failure that prevents switching of the compression ratio from the first compression ratio to the second compression ratio has been described, in the second embodiment a method of detecting failure that prevents the switching of the compression ratio from the second compression ratio to the first compression ratio, as is the case when the eccentric member 32 of the variable length connecting rod 6 is fixed at the low compression ratio position or the switching system 35 is fixed in the second state, will be described.

In the failure diagnosis of the second embodiment, when the operation state of the internal combustion engine 1 falls within the aforementioned MBT operation range and the engine load factor is lower than the aforementioned predetermined threshold, namely when the OSV 75 is controlled so as to set the compression ratio to the first compression ratio, the ECU 100 perform the advancing process for diagnosis by advancing the ignition timing of one cylinder (or target cylinder) 300 of the internal combustion engine 1 to a knock inducing ignition timing more advanced than the MBT and retarding the ignition timing of the other cylinders (or non-target cylinders) 300 to a torque reducing ignition timing more retarded than the MBT.

The knock inducing ignition timing mentioned above is such ignition timing more advanced than the MBT that leads to the occurrence of knock if the actual compression ratio of the target cylinder is equal to the first compression ratio but does not lead to the occurrence of knock if the actual compression ratio of the target cylinder is equal to the second compression ratio. In other words, the knock inducing ignition timing is an ignition timing more advanced than the knock limit ignition timing in the case where the compression ratio is equal to the first compression ratio and more retarded than the knock limit ignition timing in the case where the compression ratio is equal to the second compression ratio. The ignition timing that leads to the occurrence of knock when the actual compression ratio of the target cylinder is equal to the first compression ratio may differ between when the engine load factor is lower than the aforementioned predetermined threshold and when the engine load factor is equal to or higher than the aforementioned predetermined threshold. For this reason, the knock inducing ignition timing in this embodiment is determined by experiment and simulation separately from the knock inducing ignition timing mentioned in the first embodiment.

If the actual compression ratio of the target cylinder is equal to the first compression ratio when the advancing process for diagnosis is performed by the above-described method, knock will occur. On the other hand, if the actual compression ratio of the target cylinder is equal to the second compression ratio when the advancing process for diagnosis is performed, knock will not occur. Therefore, if the knock sensor 102 detects knock while the advancing process for diagnosis is performed, the ECU 100 may diagnose that the compression changing mechanism of the target cylinder is in a normal condition, and if the knock sensor 102 does not detect knock while the advancing process for diagnosis is performed, the ECU 100 may diagnose that the compression changing mechanism of the target cylinder is in failure.

In the following, the process of performing the failure diagnosis of the variable compression ratio mechanism according to this embodiment will be described with reference to FIG. 8. FIG. 8 is a flow chart of a processing routine executed by the ECU 100 when performing the failure diagnosis of the variable compression ratio mechanism. In FIG. 8, the processings same as those in the processing routine shown in FIG. 7 are denoted by the same reference signs.

Figure 8:
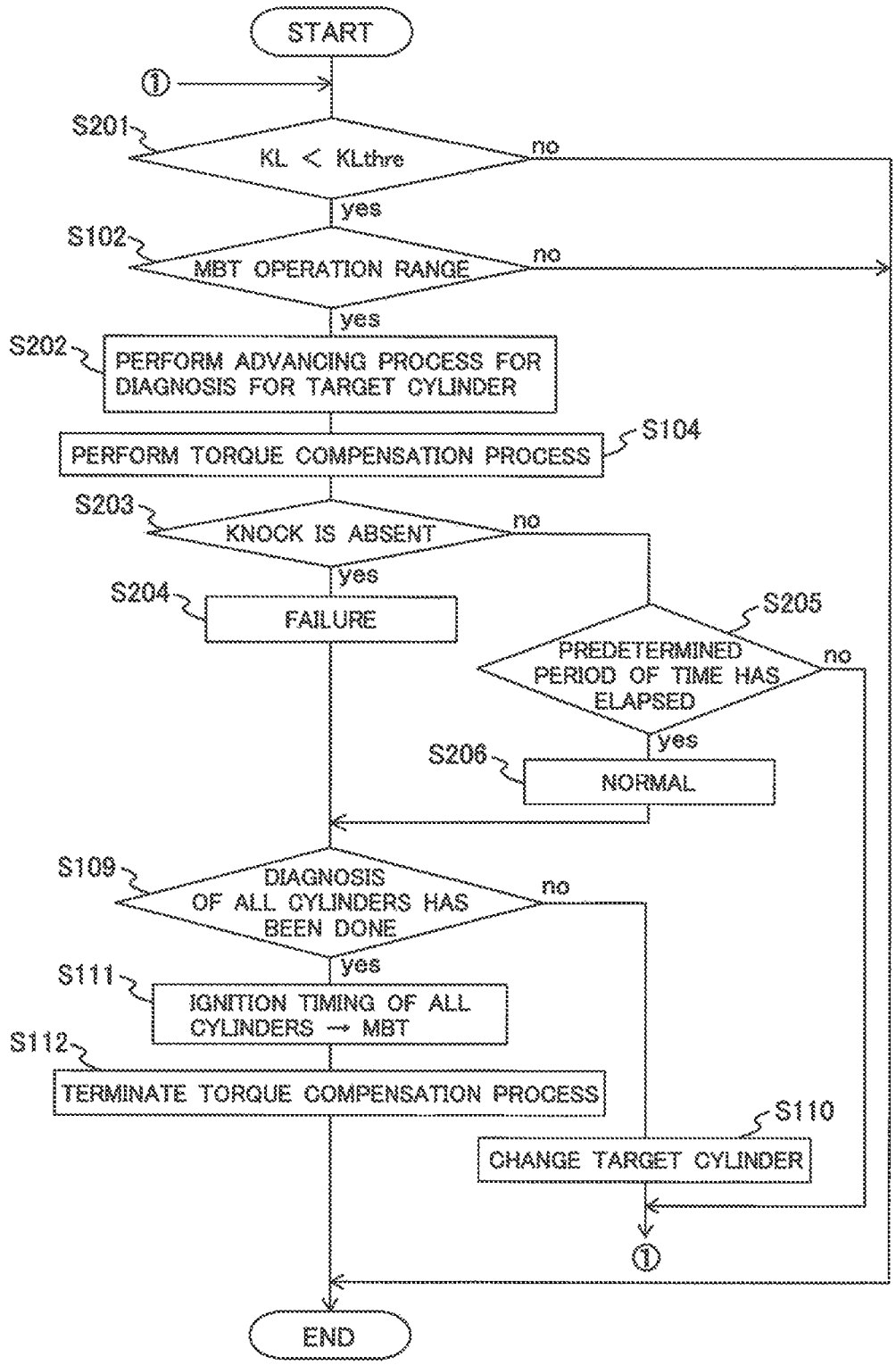
FIG. 8 is a flow chart of a processing routine executed by an ECU when performing failure diagnosis of a variable compression ratio mechanism according to a second embodiment.

The differences between the processing routine shown in FIG. 7 and the processing routine shown in FIG. 8 are that the processing of step S101 is replaced by the processing of step S201, that the processing of step S103 is replaced by the processing of step S202, and that the processing of steps S105 to S108 is replaced by the processing of steps S203 to S206.

In the processing of step S201, the ECU 100 determines whether or not the engine load factor KL calculated on the basis of the output signal of the air flow meter 101 is smaller than the predetermined threshold KLthre. If the determination made in the processing of step S201 is negative, the switching systems 35 of the cylinders 300 are controlled to be in the aforementioned second state (in which the compression ratio is set to the second compression ratio). Then, the ECU 100 terminates the execution of this processing routine without performing the advancing process for diagnosis. On the other hand, if the determination made in the processing of step S201 is affirmative, the switching systems 35 of the cylinders 300 are controlled to be in the aforementioned first state (in which the compression ratio is set to the first compression ratio). Then, the ECU 100 executes the processing of step S102 next. If the determination made in the processing of step S102 is affirmative, the ECU 100 executes the processing of step S202 next.

In the processing of step S202, the ECU 100 performs the advancing process for diagnosis by setting the ignition timing of the target cylinder to the knock inducing ignition timing and setting the ignition timing of the non-target cylinders to the torque reducing ignition timing. As described above, the knock inducing ignition timing is such ignition timing that leads to the occurrence of knock if the actual compression ratio of the target cylinder is equal to the first compression ratio but does not lead to the occurrence of knock if the actual compression ratio of the target cylinder is equal to the second compression ratio. After executing the processing of step S202, the ECU 100 executes the processing of step S104 next, where the ECU 100 performs the torque compensation process. After executing the processing of step S104, the ECU 100 executes the processing of step S203 next.

In the processing of step S203, the ECU 100 determines whether or not the knock is absent on the basis of the output signal of the knock sensor 102. If the determination made in the processing of step S203 is affirmative, the ECU 100 executes the processing of step S204 next, where the ECU 100 determines that the compression ratio changing mechanism of the target cylinder is in failure. On the other hand, if the determination made in the processing of step S203 is negative, the ECU 100 executes the processing of step S205 next, where the ECU 100 determines whether or not a predetermined period of time has elapsed from the start of the advancing process for diagnosis for the target cylinder. If the determination made in the step S205 is negative, the ECU 100 returns to the processing of step S201. If the determination made in step S205 is affirmative, the ECU 100 executes the processing of step S206, where the ECU 100 determines that compression ratio changing mechanism of the target cylinder is in a normal condition. After executing the processing of step S204 or S206, the ECU 100 executes the processing of step S109 and the subsequent steps.

By performing the failure diagnosis of the variable compression ratio mechanism in the above-described manner, the cylinder 300 of which the compression ratio changing mechanism is in failure can be identified with a reduced torque difference among the cylinders and with a reduced decrease in the overall torque of the internal combustion engine 1, when failure that prevents switching of the compression ratio from the second compression ratio to the first compression ratio (or failure that fixes the compression ratio to the second compression ratio) occurs in the compression ratio changing mechanism of any cylinder 300 of the internal combustion engine 1. Since the failure diagnosis of the variable compression ration mechanism can be performed utilizing the existing knock sensor 102, it does not require additional components.

The failure diagnosis according to the above-described first embodiment and the failure diagnosis according to the second embodiment may be employed in combination. Specifically, when the operation state of the internal combustion engine 1 falls in the aforementioned MBT operation range, if the engine load factor is equal to or higher than the predetermined threshold, the failure diagnosis according to the first embodiment may be performed, and if the engine load factor is lower than the predetermined threshold, the failure diagnosis according to the second embodiment may be performed. Such combined employment of the failure diagnosis methods enables detection of both failure that prevent switching of the compression ratio from the first compression ratio to the second compression ratio and failure that prevent switching of the compression ratio from the second compression ratio to the first compression ratio in any cylinder 300 of the internal combustion engine 1 and enables identification of the cylinder 300 of which the variable compression ratio mechanism is in failure.

While in the first and second embodiments the variable compression ratio mechanism can vary the compression ratio in two steps (i.e. the first and second compression ratios), the failure diagnosis according to the present disclosure may be applied to a variable compression ratio mechanism that can vary the compression ratio in three steps.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-140695, filed on Jul. 15, 2016, which is hereby incorporated by reference herein in its entirety.

The invention claimed is:

1. A failure diagnosis apparatus for a variable compression ratio mechanism for use in a spark-ignition internal combustion engine provided with a variable compression ratio mechanism capable of switching the compression ratio of the internal combustion engine having a plurality of cylinders between at least a first compression ratio and a second compression ratio lower than the first compression ratio and including a compression ratio changing mechanism provided in each of the cylinders of the internal combustion engine, a knock sensor attached to the internal combustion engine, and an ignition plug attached to each of the cylinders of the internal combustion engine, the failure diagnosis apparatus comprising:
a controller comprising at least one processor configured to:
perform advancing process for diagnosis to advance the ignition timing of one cylinder of the internal combustion engine to a knock inducing ignition timing more advanced than the MBT that does not lead to the occurrence of knock if the actual compression ratio of the one cylinder is the second compression ratio but leads to the occurrence of knock if the actual compression ratio of the one cylinder is the first compression ratio, when the variable compression ratio mechanism is controlled so as to set the compression ratio of the internal combustion engine to the second compression ratio; and
diagnose that the compression ratio changing mechanism of the one cylinder of which the ignition timing is advanced to the knock inducing ignition timing is in failure, if the knock sensor detects the occurrence of knock when the advancing process for diagnosis is performed.

2. A failure diagnosis apparatus for a variable compression ratio mechanism according to claim 1, wherein
when performing the advancing process for diagnosis, the controller performs a process of setting the ignition timing of the cylinders other than the one cylinder to an ignition timing more retarded than the MBT in addition to the process of advancing the ignition timing of the one cylinder of the internal combustion engine to the knock inducing ignition timing.

3. A failure diagnosis apparatus for a variable compression ratio mechanism according to claim 2, wherein
the controller is further configured to perform a torque compensation process to make the intake air quantity and the fuel injection quantity of the internal combustion engine larger when the advancing process for diagnosis is performed than when the advancing process for diagnosis is not performed.

4. A failure diagnosis apparatus for a variable compression ratio mechanism for use in a spark-ignition internal combustion engine provided with a variable compression ratio mechanism capable of switching the compression ratio of the internal combustion engine having a plurality of cylinders between at least a first compression ratio and a second compression ratio lower than the first compression ratio and including a compression ratio changing mechanism provided in each of the cylinders of the internal combustion engine, a knock sensor attached to the internal combustion engine, and an ignition plug attached to each of the cylinders of the internal combustion engine, the failure diagnosis apparatus comprising:

a controller comprising at least one processor configured to:

perform advancing process for diagnosis to advance the ignition timing of one cylinder of the internal combustion engine to a knock inducing ignition timing more advanced than the MBT that leads to the occurrence of knock if the actual compression ratio of the one cylinder is the first compression ratio but does not lead to the occurrence of knock if the actual compression ratio of the one cylinder is the second compression ratio, when the variable compression ratio mechanism is controlled so as to set the compression ratio of the internal combustion engine to the first compression ratio; and diagnose that the compression ratio changing mechanism of the one cylinder of which the ignition timing is advanced to the knock inducing ignition timing is in failure, if the knock sensor does not detect the occurrence of knock when the advancing process for diagnosis is performed.

* * * * *